United States Patent
Szymański

(10) Patent No.: US 12,411,829 B2
(45) Date of Patent: Sep. 9, 2025

(54) EFFICIENT HASH TABLE BASED PROCESSING OF DATABASE QUERIES

(71) Applicant: Oxla sp. z o.o., Warsaw (PL)

(72) Inventor: Adam Szymański, Warsaw (PL)

(73) Assignee: Oxla sp. z o.o., Warsaw (PL)

( * ) Notice: Subject to any disclaimer, the term of this patent is extended or adjusted under 35 U.S.C. 154(b) by 37 days.

(21) Appl. No.: 18/310,455

(22) Filed: May 1, 2023

(65) Prior Publication Data

US 2024/0264993 A1 Aug. 8, 2024

(30) Foreign Application Priority Data

Feb. 8, 2023 (PL) .......................... 443718

(51) Int. Cl.
*G06F 16/22* (2019.01)
*G06F 16/24* (2019.01)
*G06F 16/2453* (2019.01)
*G06F 16/2455* (2019.01)

(52) U.S. Cl.
CPC ...... *G06F 16/2255* (2019.01); *G06F 16/2237* (2019.01); *G06F 16/24542* (2019.01); *G06F 16/2455* (2019.01); *G06F 16/24552* (2019.01); *G06F 16/2456* (2019.01); *G06F 16/24561* (2019.01)

(58) Field of Classification Search
CPC ............. G06F 16/2255; G06F 16/2237; G06F 16/24542; G06F 16/24552; G06F 16/24561; G06F 16/2455; G06F 16/2456
See application file for complete search history.

(56) References Cited

U.S. PATENT DOCUMENTS

| | | |
|---|---|---|
| 9,531,839 B1 | 12/2016 | Wang et al. |
| 10,248,663 B1 | 4/2019 | Keisler et al. |
| 10,366,083 B2 | 7/2019 | Chavan et al. |
| 10,558,659 B2 | 2/2020 | Hopeman et al. |
| 10,776,401 B2 | 9/2020 | Gross et al. |
| 10,977,234 B2 | 4/2021 | Arye et al. |
| 11,138,175 B2 | 10/2021 | Arye et al. |
| 11,238,039 B2 | 2/2022 | Chavan et al. |
| 2004/0243257 A1 | 12/2004 | Theimer |

(Continued)

OTHER PUBLICATIONS

Henderson, Michael. Multi-way hash join effectiveness. Diss. University of British Columbia, 2013. (Year: 2013).*

(Continued)

*Primary Examiner* — Mohsen Almani
(74) *Attorney, Agent, or Firm* — Fenwick & West LLP

(57) ABSTRACT

A database system uses a hash table for processing database queries. The system stores keys mapped to data values in the hash table. For processing a set of records using the hash table, the system partially sorts the records to match the order of keys of the hash table. The partial storing of the records results in improving the performance of a cache storing the hash table. The hash table may be a multimap that maps a key to multiple data values. The system stores data values mapped to a key in a vector that stores all data values mapped to the key in contiguous memory. The system stores a pointer to the vector in association with the key in the multimap. The system optimizes the multimap to store the data value instead of the pointer if there is a single data value associated with a key.

20 Claims, 17 Drawing Sheets

(56) References Cited

U.S. PATENT DOCUMENTS

| | | |
|---|---|---|
| 2006/0095485 A1 | 5/2006 | Moore |
| 2015/0039628 A1 | 2/2015 | Sen et al. |
| 2015/0143112 A1 | 5/2015 | Yavuz et al. |
| 2015/0288691 A1* | 10/2015 | Dickie ................ G06F 16/244 713/181 |
| 2016/0267135 A1 | 9/2016 | Idicula et al. |
| 2016/0350375 A1* | 12/2016 | Das .................... G06F 16/2456 |
| 2017/0031976 A1 | 2/2017 | Chavan et al. |
| 2018/0081939 A1 | 3/2018 | Hopeman et al. |
| 2018/0081946 A1* | 3/2018 | Bondalapati ........ G06F 16/2456 |
| 2018/0089261 A1 | 3/2018 | Li et al. |
| 2018/0165348 A1 | 6/2018 | Cole et al. |
| 2018/0217987 A1 | 8/2018 | Helland et al. |
| 2018/0276289 A1 | 9/2018 | Gross et al. |
| 2019/0205459 A1 | 7/2019 | Busjaeger et al. |
| 2019/0220461 A1 | 7/2019 | Chavan et al. |
| 2021/0034586 A1 | 2/2021 | Arye et al. |
| 2021/0034598 A1 | 2/2021 | Arye et al. |
| 2021/0149897 A1* | 5/2021 | Kim ................ G06F 16/24535 |
| 2021/0191915 A1 | 6/2021 | Arye et al. |
| 2022/0277010 A1* | 9/2022 | Zhou ................ G06F 16/24556 |
| 2023/0120492 A1 | 4/2023 | Shalom et al. |

OTHER PUBLICATIONS

Shin, Hyunkwang, Ingyu Lee, and Gyu Sang Choi. "Bucket-Sorted Hash Join." Journal of Information Science & Engineering 36.1 (2020). (Year: 2020).*

Dong, Wei, et al. "ASH: A modern framework for parallel spatial hashing in 3D perception." IEEE transactions on pattern analysis and machine intelligence 45.5 (2022): 5417-5435. (Year: 2022).*

Jünger, Daniel, et al. "General-purpose GPU hashing data structures and their application in accelerated genomics." Journal of Parallel and Distributed Computing 163 (2022): 256-268. (Year: 2022).*

United States Office Action, U.S. Appl. No. 18/310,460, May 21, 2024, 13 pages.

United States Office Action, U.S. Appl. No. 18/310,459, May 10, 2024, 11 pages.

United States Patent Office, Office Action, U.S. Appl. No. 18/310,459, Oct. 31, 2024, 11 pages.

* cited by examiner

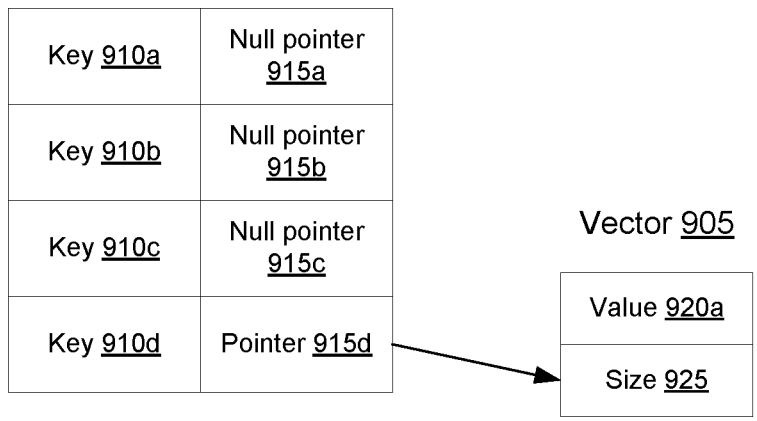

EFFICIENT HASH TABLE BASED PROCESSING OF DATABASE QUERIES

FIELD OF INVENTION

This disclosure relates generally to execution of database queries and more specifically to using hash tables for storing data processed by database queries.

BACKGROUND

Enterprises often use databases, for example, relational databases for processing data. Users execute applications that invoke database queries that process the data stored in the databases. The queries are sent by the applications are received and processed by a database system. The amount of data stored and processed by a database system can be large. As a result, often multiple processors are used for processing database queries. Furthermore, database systems use caching to store data in memory for fast access. Database systems often use data structures for storing data of tables in memory, for example, hash tables. The performance of the cache has a significant impact on the performance of the database system. For example, if the processing of the database query results in large number of cache hits, the performance of the database query is good. However, if the processing of a database query results in large number of cache misses, the performance of the database query is poor.

SUMMARY

The above and other issues are addressed by a computer-implemented method, computer system, and computer readable storage medium storing instructions for processing database queries. The system according to an embodiment processes database queries using a hash table. The system receives a database query for processing data stored in one or more input tables. The system stores data in a hash table including multiple keys. The hash table associates one or more data values with each key. The keys of the hash table are stored in a particular order. The system processes the database keys by performing the following steps. The system receives a set of records, each record associated with a key. The system reorders the set of records such that the reordered set of records that is at least partially sorted to match the order of keys of the hash table. The system accesses the hash table in order of the reordered set of records. Accordingly, for each record, the system accesses a data value stored in the hash table that is mapped to a key corresponding to the record. The system determines a set of results based on data values accessed from the hash table. The system provides the set of results determined as a result of processing the database query.

The system according to an embodiment processes database queries using a multimap. The system receives a database query for processing data stored in one or more database tables. The system receives a first set of records based on the one or more database tables. For each record from the first set of records, the system determines a key and a data value based on the record and stores the data value in a vector mapped to the key. The vector stores an element representing a size value based on a number of data values mapped to the key. The system stores in the multimap a pointer to the vector in association with the key. The system receives a second set of records for processing using the hash table. The system repeats the following steps for each record of the second set of records. The system determines a key corresponding to the record and accesses a pointer corresponding to the key from the multimap. The system accesses data values stored in a vector pointed at by the pointer and determines one or more result values based on the data values accessed. The system sends a result of processing the database query based on result values determined using the multimap.

A system according to an embodiment optimizes data storage in a multimap for processing database queries. The system receives a database query for processing data stored in a database table. The system receives a set of records based on the database table. The system allocates a multimap configured to store tuples. Each tuple includes a first element and a second element. The system identifies from the set of records, a record associated with a particular key and a first data value. If are no data values stored in the multimap for the particular key, the system stores a tuple in the multimap based in the record. The tuple includes the particular key as the first element and the first data value as the second element. The system identifies a second record associated with the particular key and a second data value. If the system determines that the multimap stores a tuple having the particular key as the first element and a data value as the second element, the system allocates a vector, changes the second element of the tuple to store a pointer to the vector, and stores the first data value and the second data value in the vector.

Embodiments of a non-transitory computer readable storage medium that stores instructions for performing the steps of the above method. Embodiments of the computer system comprise one or more computer processors and a non-transitory computer readable storage medium that stores instructions for performing the steps of the above method.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

FIG. 9A shows an example multimap that is configured to store four distinct keys, according to an embodiment.

FIG. 9B shows the example multimap after a data value is stored in association with a key, according to an embodiment.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
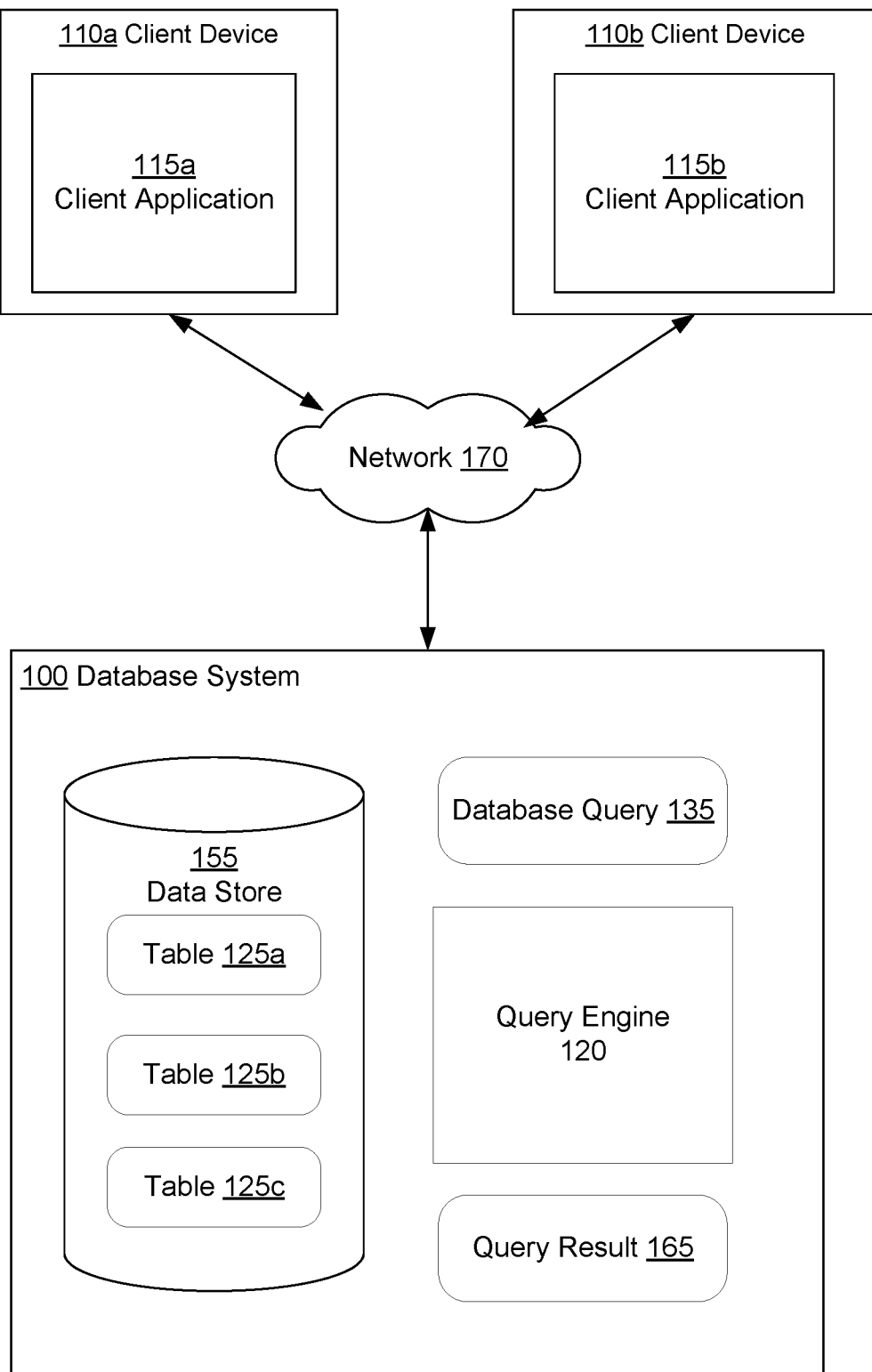
FIG. 1 is a block diagram of a system environment in which a database system operates, in accordance with an embodiment.

FIG. 1 is a block diagram of a system environment in which a database system operates, in accordance with an embodiment. The system environment 105 comprises a database system 100, one or more client devices 110, and a network 170. The system environment 105 may include multiple client devices 110. Other embodiments may have more of fewer systems within the system environment 105. Functionality indicated as being performed by a particular system or a module within a system may be performed by a different system or by a different module than that indicated herein. A database system may also be referred to herein as a system or as a database management system.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

The database system 100 includes a data store 155 that stores data processed using database queries. In an embodiment, the database system 100 is relational database system and the data is stored as relational tables 125a, 125b, 125c, and so on. In other embodiments, the database system 100 can process data stored in any other format, for example, an object-based database system that stores data as objects. The database queries may be specified using a query language, for example, SQL (structured query language) but are not limited to SQL.

Client applications 115a, 115b running on client devices 110a, 110b interact with the database system 100 to process the data stored in the data store 155. A client application 115 running on a client device 110 may send a database query 135 to the database system 100. The query engine 120 of the database system 100 executes the database query 135 to process the data stored in the data store 155 and determine a query result 165. The database system 100 returns the query result 165 to the client application 115. The system streams the query result to the client application to avoid having to buffer the query result data.

A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115 for interacting with the search system 100, for example, a browser. Although, FIG. 1 shows two client devices, the system environment 105 can include many more client devices 110.

The network 170 enables communications between various systems within the system environment 105, for example, communications between the client device 110 and the database system 100. In one embodiment, the network uses standard communications technologies and/or protocols. The data exchanged over the network can be represented using technologies and/or formats including, the HTML, the XML, JSON, and so on.

System Architecture

Figure 2:
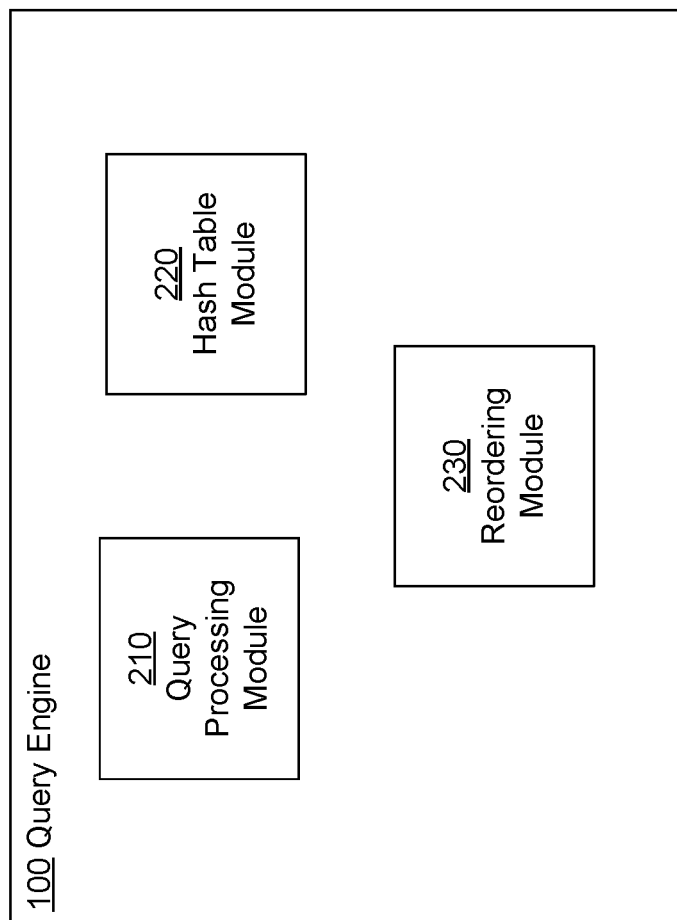
FIG. 2 shows the system architecture of a query engine of a database system, in accordance with an embodiment.

FIG. 2 shows the system architecture of a query engine of a database system, in accordance with an embodiment. The query engine includes a query processing module 210, a hash table module 220, and a reordering module 230. Other embodiments of the query engine may include more of fewer modules.

The query processing module 210 parses a database query and generates a query execution plan for executing the database query. In an embodiment, the execution plan for executing a database query comprises a set of operators. An operator receives one or more data input elements, performs an operation using the one or more data input elements and generates one or more output data elements. Examples of operators include filter operator to filter rows, a transform operator to transform an input value based on a function or a set of instructions, a group by operator to group input elements by a key, and so on. The output generated by an operator O1 may be provided as input to another operator O2. Accordingly, the query execution plan may be considered a graph of operators where each node is an operator and an edge represents transfer of data from one operator to another operator.

The hash table module 220 manages data processed by database queries by storing the data in hash tables. The hash table stores keys and one or more data values per key. The hash table may be a multimap that allows multiple data values to be associated with a key. The hash table module 220 implements various techniques for optimizing the hash table as described herein.

The reordering module 230 performs reordering of data processed using hash tables. According to an embodiment, the reordering module performs partial sorting of a set of keys that are being accessed in the hash table. The reordering of the keys allows efficient access of data from the hash table.

Figure 3:
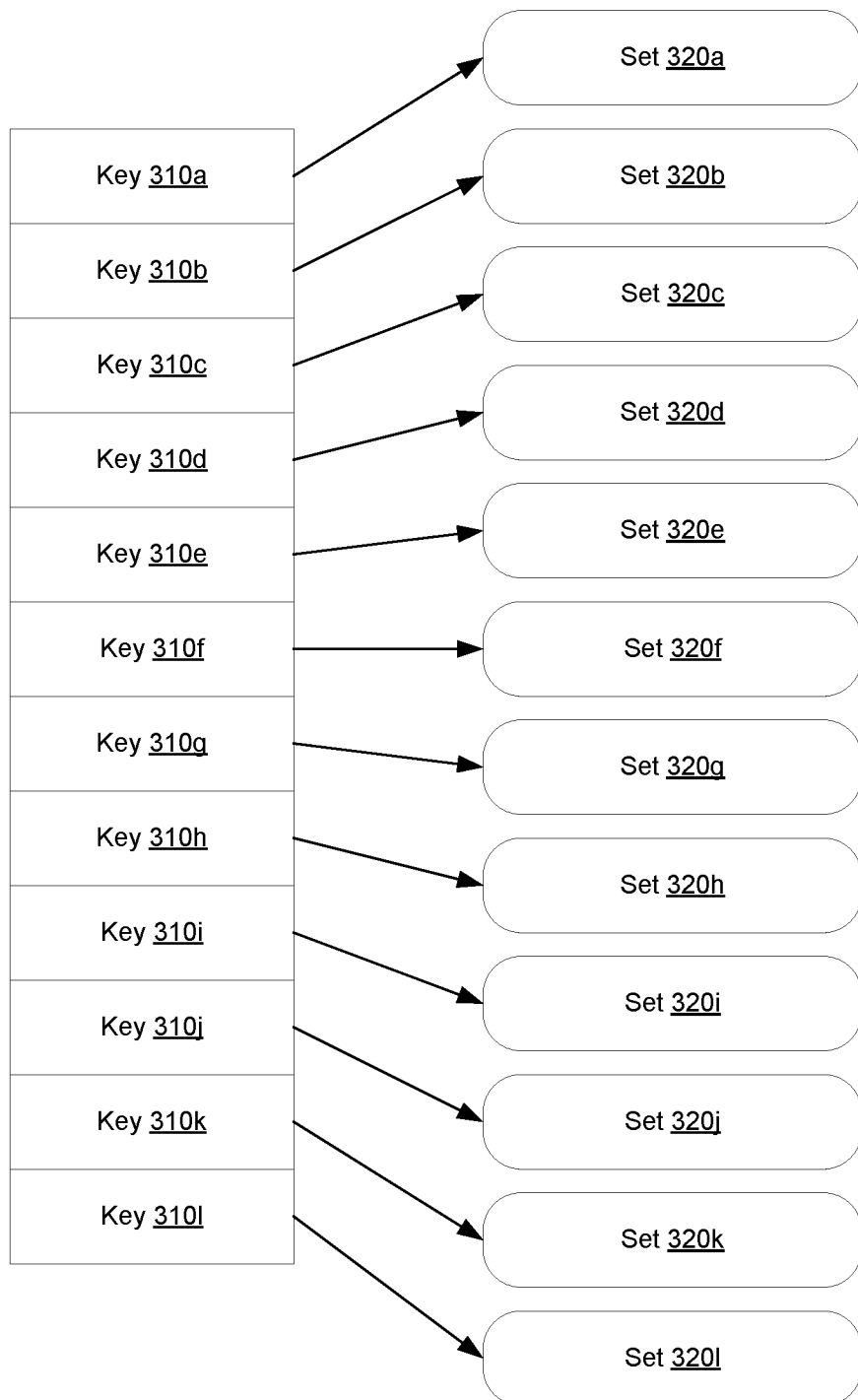
FIG. 3 illustrates a hash table 300 used for query processing by the database system, in accordance with an embodiment.

FIG. 3 illustrates a hash table 300 used for query processing by the database system, in accordance with an embodiment. The hash table stores a set of keys, each key associated with a set of data values. For example, FIG. 3 shows keys 310*a*, 310*b*, 310*c*, 310*d*, 310*e*, 310*f*, 310*g*, 310*h*, 310*i*, 310*j*, 310*k*, 310*l* that are associated with sets of data values 320*a*, 320*b*, 320*c*, 320*d*, 320*e*, 320*f*, 320*g*, 320*h*, 320*i*, 320*j*, 320*k*, 320*l* respectively. A set of data values may be empty or may include one or more data values. The data values may represent records of the database. The data values may represent partial results of computations. A hash table may also be referred to herein as a hash map.

For example, the hash table 300 may be used for performing a group-by operation. The group by operation may be requested using a database query (or a statement) that specifies a GROUP BY clause. The group by statement may group rows that have the same values into summary rows. An example of a group by query based on a table storing user data requests the database system to "find the number of users in each geographical region". The group by query may be used with an aggregate function, for example COUNT( ), MAX( ), MIN( ), SUM( ), AVG( ) to group a result-set by one or more columns or attributes.

The database system may use the hash table to map each group with a partial result. For example, the system iterates through records of the table to identify the appropriate group for each record and update a partial result for the group.

For example, assume that the group by query requests a count of number of records for each key where a key value is determined based on one or more columns of a table. The system generates a hash table based on distinct value of the keys and store a count value associated with each key. The system iterates through a set of input records. For each record, the system determines a key and increments the count value associated with the key value that is stored in the hash table. The count values generated when all the input records are processed represent the counts for each key value.

In general, assume that the group by query requests an aggregate function (for example, sum, maximum, minimum, etc.) of records for each key where a key value is determined based on one or more columns of a table. The system generates a hash table based on distinct value of the keys and store a count value associated with each key. The system iterates through a set of input records. For each record, the system determines a key and updates a partial aggregate value associated with the key value that is stored in the hash table. The partial aggregate values generated when all the input records are processed represent the final aggregate value for each key value.

The system may use a hash table for performing join operation between two or more tables. For example, the hash table may be used to join tables T1 and T2. The system may generate a hash table based on one of the tables, for example, T1. The system iterates through the records of the other table T2 to match the key based on each record against keys of the hash table. If a match is determined, the system may generate a result record based on values of the columns of tables T1 and T2 that are specified as results of the join query.

Processes

Figure 4:
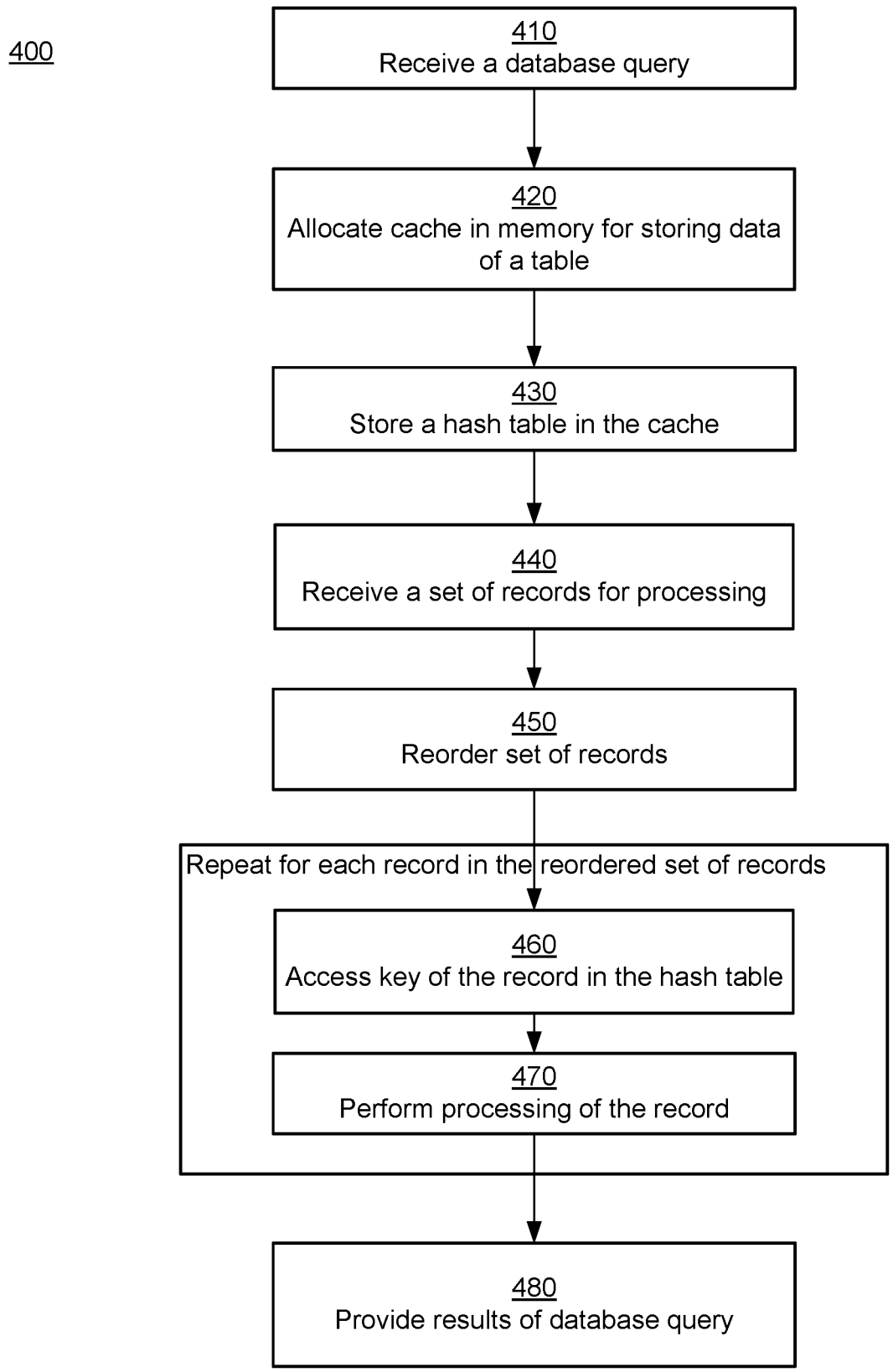
FIG. 4 is a flowchart of a process 400 of execution of a database query using a hash table, in accordance with an embodiment.

FIG. 4 is a flowchart of a process 400 of execution of a database query using a hash table, in accordance with an embodiment. The steps shown in this process can be executed in an order different from those shown in the flowcharts. Furthermore, various steps can be executed by modules other than those indicated herein.

The system receives 410 a database query for processing data stored in one or more input tables. The system allocates 420 a cache storing a hash table. The hash table is configured for storing a plurality of keys and associating one or more data values with each key. The hash table stores the keys in a particular order, for example, sorted order of keys.

The system receives 440 a set S of records for processing using the hash table. Each record is associated with a key. For example, the key may be represented by one or more columns of the records. The system reorders 450 the set records to obtain a reordered set S of records. The reordered set S of records is at least partially sorted to match the order of keys of the hash table.

The system iterates through the records of the set S of records. Accordingly, the system repeats the step 460 for each record form the reordered set S of records. The system accesses 460 a data value stored in the hash table that is mapped to a key corresponding to the record. The system performs 470 processing based on the data value accessed from the hash table using the key corresponding to the record. The processing performed 470 depends on the type of database query being processed. The system determines a set of results based on data values accessed from the hash table. For example, the results may represent the aggregate values corresponding to a set of keys if the database query is a group by query. The system provides 480 the set of results as the result of processing the database query.

The system performs the reordering of the set S of records in an efficient manner. For example, the system may fully sort the set S of records. Sorting the records may be a time-consuming process. Accordingly, the system partially sorts the records using a process that is linear in time with respect to the number of records in the set S of records. According to an embodiment, the system executes two passes that iterate through the records of the set S of records to partially sort the as illustrated in FIGS. 5 and 6.

The system determines buckets for categorizing keys of the hash table. The buckets may be defined based on ranges of values of keys. For example, if the keys represent certain identifiers, the system may define buckets based on ranges of the identifier values. For example, a keys within a range of identifiers ID1 . . . ID2 may map to a bucket B1, keys within a range of identifiers ID2 . . . ID3 may map to a bucket B2, keys within a range of identifiers ID3 . . . ID4 may map to a bucket B3, and so on.

The system first determines a number of records of the set S of records that are assigned to each bucket. The system uses the number of records assigned to each bucket to determine the amount of space needed to store the portion of the hash table corresponding to each bucket. The system uses the measure of the amount of space as an offset for the next bucket of the hash table when the data of the buckets are stored consecutively.

Figure 5:
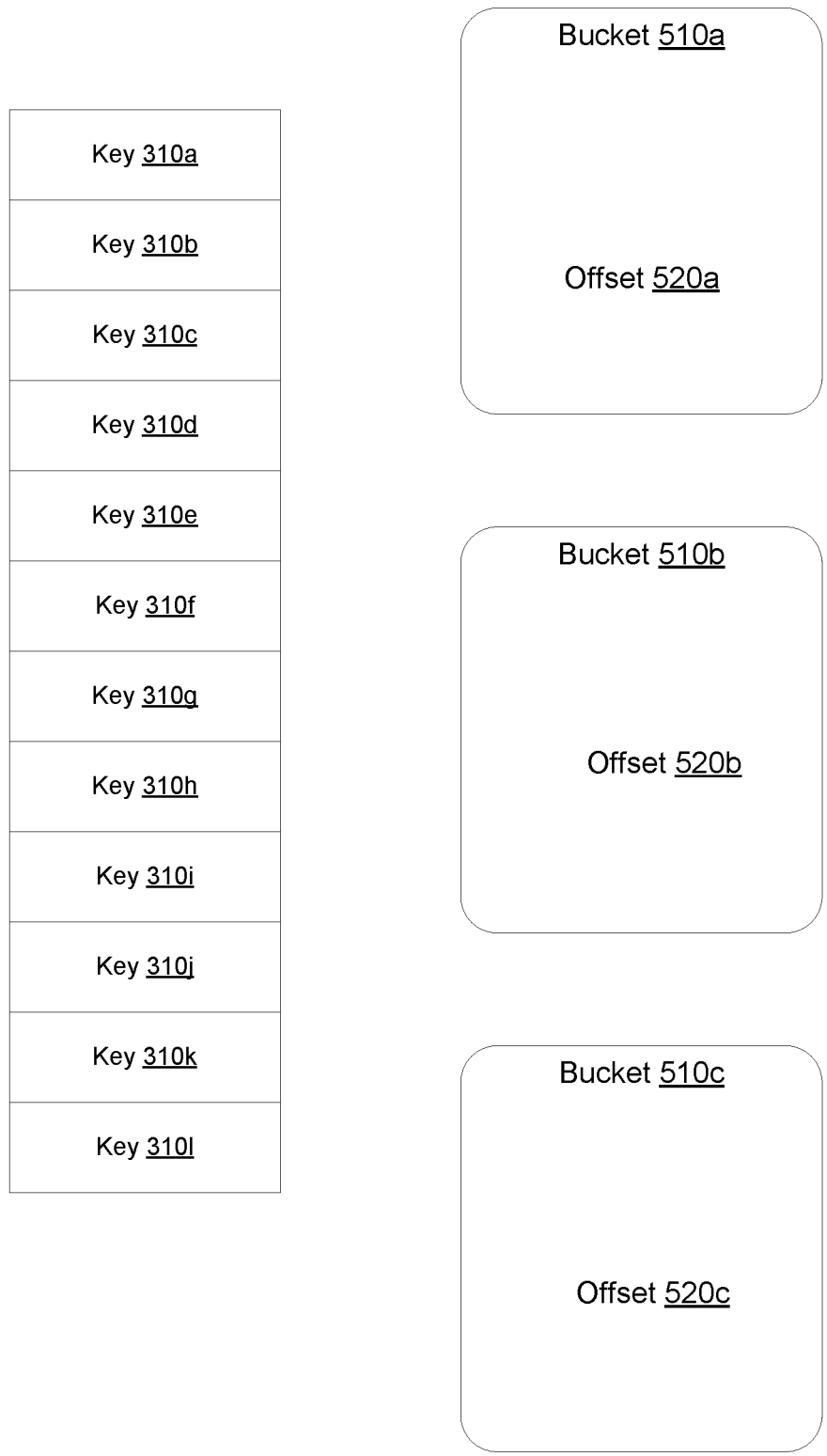
FIG. 5 illustrates a first pass through the set S of records to determine offsets of partially sorted records for each bucket associated with a hash table, in accordance with an embodiment.
Figure 6:
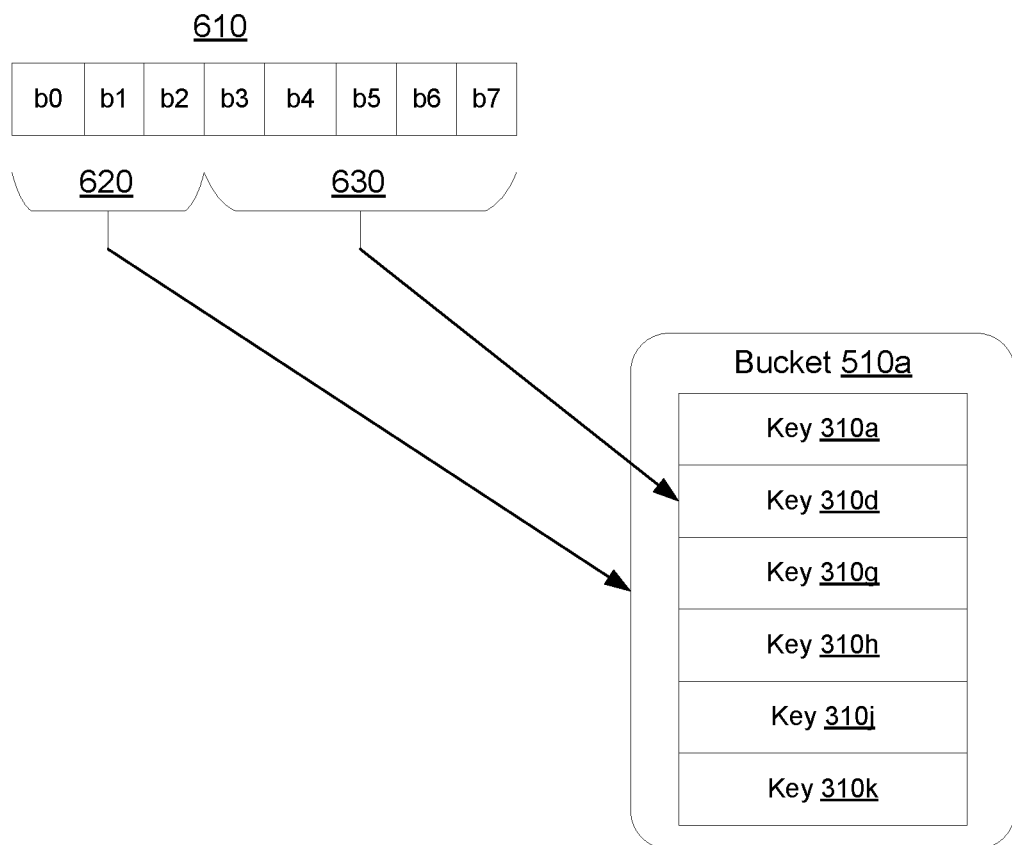
FIG. 6 illustrates a mechanism for determining a bucket associated with a key, according to an embodiment.

FIG. 5 illustrates a first pass through the set S of records to determine offsets of partially sorted records for each bucket associated with a hash table, in accordance with an embodiment. In the first pass the system iterates through all the keys of the input set S of records and for each key determines the bucket to which the key is assigned. Accordingly, the system access a record and determined the key associated with the record. The system determines which bucket the key is associated with. According to an embodiment, the system maintains a count of number of records of the set S of records assigned to each bucket. For every record that is determined to be associated with a particular bucket, the system increments the count value associated with that particular bucket. The system repeats this process for each record of the input set. The buckets are stored in a sorted order. For example, all keys of bucket B1 are stored before the keys of bucket B2 and all keys of bucket B2 are stored after the keys of bucket B1 but before the keys of the bucket B3, and so on.

The system uses the count of the number of records assigned to each bucket 510 to determine the offset 520 of the key for the next bucket. For example, the offset of bucket 510a is 520a, the offset of bucket 510b is 520b, the offset of bucket 510c is 520c, and so on. The offset of the first bucket 510a is zero since that is the first bucket. The offset of the second bucket 510b is the number of keys stored in the first bucket 510a. The offset of the bucket 510c is the sum of the count of keys stored in all buckets that are ranked lower than the bucket 510c in the sorted order of buckets, i.e., buckets 510a and 510b. In general, the system determines the offset of any particular bucket as the sum of the count of keys stored in all buckets that are ranked lower than that particular bucket in the sorted order of buckets. The offset of a bucket may be determined as a prefix sum of counts of keys of the buckets. The system uses the offsets calculated for each bucket to determine where to start storing keys assigned to that particular bucket.

FIG. 6 illustrates a mechanism for determining a bucket associated with a key, according to an embodiment. The value of key 810 is shown as binary numbers (bits). For example, FIG. 6 shows a key 610 represented using 8 bits b0, b1, b2, b3, b4, b5, b6, b7. The key can be stored as any other number of bits. A subset of bits of the binary representation of the key is used to determine the bucket associated with the key. For example, a subset 620 of most significant bits of the binary representation of the key 610 is mapped to a bucket 510. The subset 630 of bits that are remaining determine the position of the key within the bucket 510. The system partially sorts the keys of the set S of records such that the keys are assigned to the right bucket but may not be sorted within the buckets. For example, if a set S1 of keys obtained from the set S of records is assigned to a bucket B1 and a set S2 of keys from the set S of records is assigned to another bucket B2, any key assigned to the bucket B1 is smaller than any key assigned to bucket B2. However, the keys within the individual buckets B1 and B2 are not sorted in any particular order.

Figure 7:
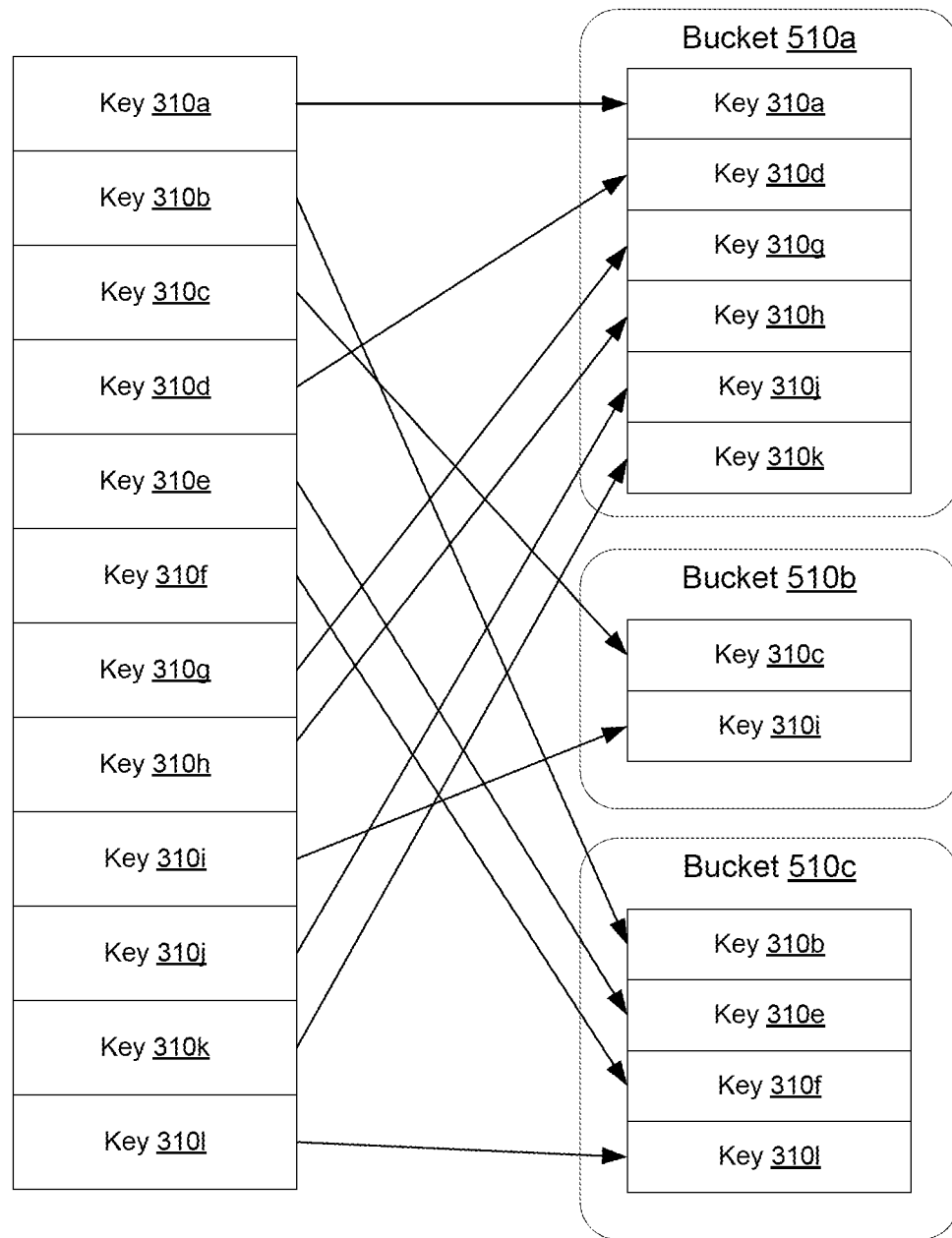
FIG. 7 illustrates a second pass for partial sorting of records using the buckets associated with the hash table, in accordance with an embodiment.

Once the system has determined the offsets for each bucket, the system performs a second pass through the records to store the keys in the individual buckets. FIG. 7 illustrates a second pass for partial sorting of records using the buckets associated with the hash table, in accordance with an embodiment. The system iterates through all the records of the set S of records. For each record, the system determines the bucket associated with the record, for example, using a subset of bits used to represent the key corresponding to the bucket as shown in FIG. 6. The hash table includes spaces for storing keys. Initially all spaces of the hash table are unassigned. If the system determines that a record is associated with a key that is assigned to a bucket, the system stores that key in that bucket in the next available space. According to an embodiment, the system stores a pointer at the next free space available in each bucket. If the system stores a key in a bucket, the system advances the pointer to the next space. For example, if each space corresponds to an element of the array, the system may store an integer representing a position in the array as a pointer to the next available space for a bucket. If the system stores a key for a record in the space pointed at by the pointer, the system increments the pointer by one to point at the next free space in the array.

In the example shown in FIG. 6, the input set S of records has 12 records and accordingly 12 keys. The system determines that the bucket 510a includes 6 keys, the bucket 510b includes 2 keys and the bucket 510c includes 4 keys. Accordingly, the system determines the offset for the first bucket 510a as zero. The system determines the offset for the second bucket 510b as the number of keys of the buckets ranked lower that bucket 510b. Since there is only one bucket 510a ranked lower than bucket 510b and bucket 510a has 6 elements, the offset of the bucket 510b is 6. The system determines the offset for the third bucket 510c as the number of keys of the buckets ranked lower that bucket 510b, i.e., buckets 510a and 510b. Since bucket 510a has 6 elements and bucket 510b has 2 elements, the offset of the bucket 510c is the sum of number of elements of buckets 510a and 510b, i.e., 8. Initially, the available space pointer of bucket 510a is 0, the available space pointer of bucket 510b is 6, and the available space pointer of bucket 510c is 8.

The system first accesses the record corresponding to key 310a and determines that the key 310a goes to bucket 510a. The system stores the key 310 in bucket 510a and increments the available space pointer of the bucket 510a to 1. The system next accesses key 310b and determines the bucket for key 310b as bucket 510c. The system stores the key 310b in position 8 represented by the available space pointer of bucket 510c and increments the available space pointer of bucket 510c to obtain 9. The system next accesses key 310c and determines the bucket for key 310c as bucket 510b. The system stores the key 310c in position 6 represented by the available space pointer of bucket 510b and increments the available space pointer of bucket 510b to obtain 7. The system next accesses key 310d and determines the bucket for key 310c as bucket 510a. The system stores the key 310d in position 1 represented by the available space pointer of bucket 510a and increments the available space pointer of bucket 510b to obtain 2. This process continues as the system determines the bucket for each key of the set S of records, stores the key in the position represented by the available space pointer of the bucket and increments the available space pointer for that bucket. The system repeats this process for each record of the set S of records.

Figure 8:
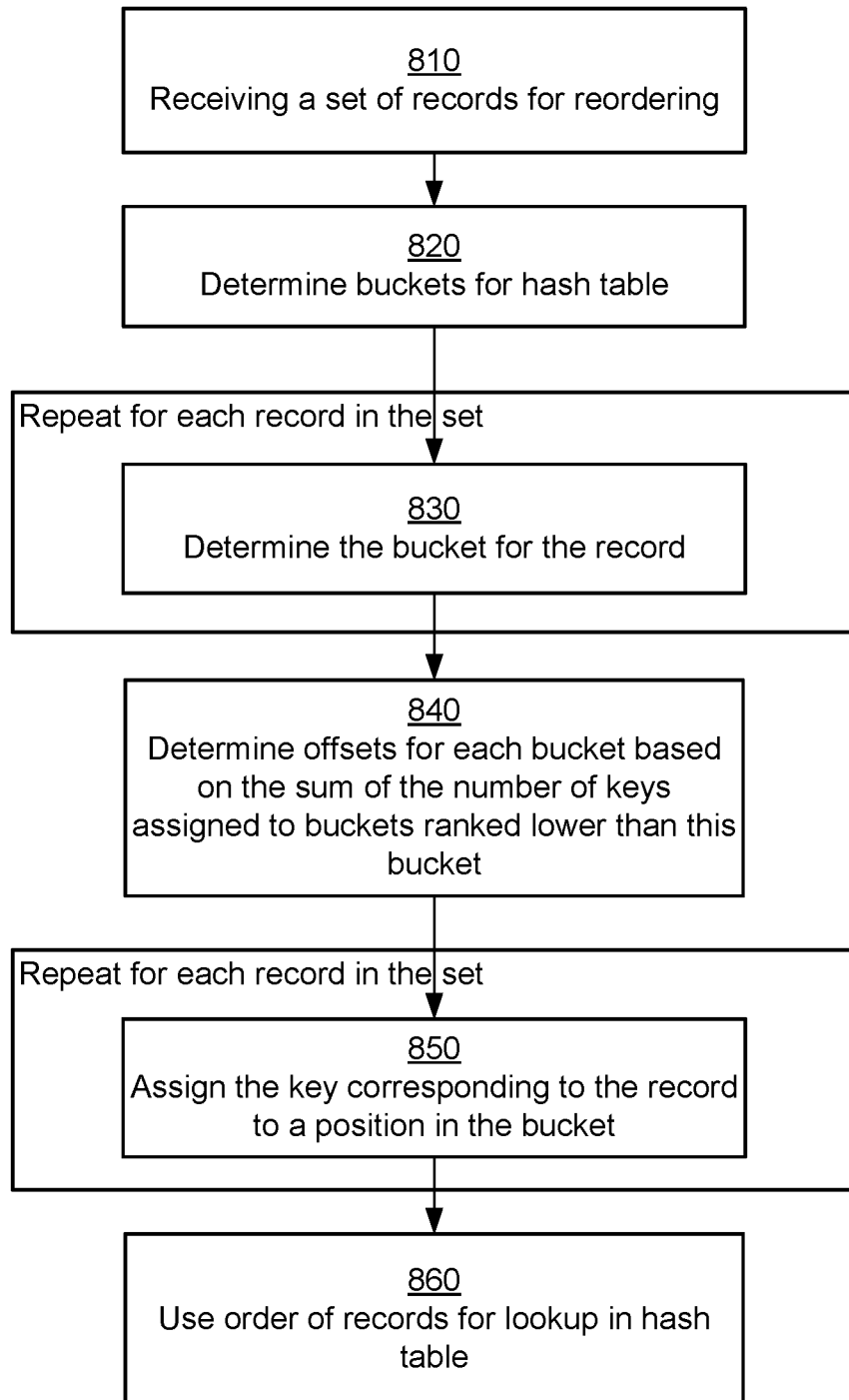
FIG. 8 shows a process illustrating the reordering of records for efficient processing of a database query using a hash table, according to an embodiment.

FIG. 8 shows a process illustrating the reordering of records for efficient processing of a database query using a hash table, according to an embodiment. The steps shown in this process can be executed in an order different from those shown in the flowcharts. Furthermore, various steps can be executed by modules other than those indicated herein.

The system receives 810 a set S of records for reordering. The system determines 820 the buckets for the hash table, for example, the system determines the total number of buckets for the hash table and the ranges for each bucket. The system maintains a counter representing the number of keys assigned to each bucket. The counter value for each bucket is initialized to zero. The system iterates through the records of the set S. Accordingly, the system repeats the step 830 for each record of the set S. The step 830 comprises determining the bucket to which the record is assigned and incrementing a counter associated with the bucket. When the system completes iterating through all the records of the set S, the system has computed the counts of keys assigned to each bucket.

The system determines 840 the offsets for each bucket based on the sum of the number of keys assigned to buckets ranked lower than the present bucket. The system performs the second pass through the records of the set S by repeatedly executing the step 850 for each record of the set S. The step 850 comprises assigning the key corresponding to the record to a position in the bucket. The order of the keys within each bucket is immaterial. The system simply ensures that each key is stored in the right bucket assigned to the key. Accordingly, the system partially sorts the records of the set S.

The system uses the partially sorted order of the keys corresponding to the records of the set S to access the hash table. Accessing the records in the partially sorted order ensures that the system access data assigned to the same bucket together. This allows efficient access of the data stored in the cache, resulting in a high rate of cache hits. As a result, the processing of the database query is performed efficiently. Performance measurements of database queries has shown 15-20% improvement in the performance as a result of the techniques disclosed herein as compared to an equivalent system that does not use the techniques disclosed.

Processing Database Queries Using Multimaps

According to an embodiment, the database system stores data using a multimap for processing database queries. A multimap is a data structure that is structured to map keys to data values such that a single key can be mapped to multiple data values. All techniques described herein based on hash tables may also be implemented using a multimap. A multimap can be implemented by storing the data values associated with a key using a linked list, for example, a list of vectors or a list of objects storing sets of data values. The term vector is used synonymously with the term array that stores data values in contiguous memory locations. Accessing data in such a structure has slow performance since the database system may have to perform multiple memory load operations that access different cache lines. For a vector data structure, the system is able to determine the location of any given data value from the location of the first data value and the size of a single data value, for example, M words. For example, if the system determines that the location of the first data value id loc1, the system determines that the location of the second data value is loc2=loc1+M; the location of the third data value is loc2=loc1+2*M; the location of the fourth data value is loc2=loc1+3*M; and the location of the $N^{th}$ data value is loc2=loc1+(N-1)*M.

The system, according to various embodiments, stores data for a multimap in a performance efficient way such that accessing of data values associated with a key is efficient and reduces the number of cache misses compared to a conventional linked list based structure. The data values stored are typically larger than the size of a machine word. According to an embodiment, the multimap stores a set of pairs, each pair including a key and a pointer to a structure that stores the data values.

FIGS. 9A-D illustrate use of an example multimap data structure that uses a vector to store all data values associated with a key, according to an embodiment. In general, the multimap data structure uses a data structure that stores all data values associated with a key in a contiguous portion of memory. Accordingly, each data value associated with a key is stored adjacent to one or more other data values associated with that key. Storing the data values adjacent to each other reduces the likelihood of cache misses. This makes the data multimap data structure as disclosed more computationally efficient compared to a multimap data structure that uses linked lists to store data values associated with a key or any structure that requires multiple memory load operations to access the data values for a single key.

According to an embodiment, the system stores the number of data values mapped to a key as the last element of the vector storing data values for that key. The multimap data structure stores a pointer to the vector mapped to a key in associated with the key. The pointer associated with a key may be null if there are no data values associated with that key. However, if there are one or more data values associated with a key, the multimap data structure stores the data values in a vector and uses one of the elements of the vector to store the number of data values associated with the key. Accordingly, if there are one or more data values associated with a key, the multimap data structure stores a pointer to last vector element. This last vector element stores the vector's length. According to an embodiment, the number of data values associated with the key is stored in the vector as an element. The number of data values associated with a key is stored adjacent to and after the last element storing a data value that is mapped to the key. The pointer to the vector that is stored in the multimap points at the element of the vector that stores the number of data values, i.e., the last element of the vector that stores a valid value.

Given the location of the last element of the vector that stores the size value, the system determines the location of the first data element. For example, if the location of the element of the vector storing the size value is locX, and the size value is N indicating there are N data values in the vector, the system determines that the location of the element storing the first data value is locX−N*M where M is the size of each data element. Accordingly, the system uses the size value and the pointer $P_N$ at the element of the vector storing the size value to determine a pointer $P_1$ representing the location of the first element of the vector by subtracting the size of N data values from the pointer $P_N$, i.e., $P_1=P_N-N*M$.

A multimap data structure comprises a core body that stores key values and pointers and a set of structures pointed at by the pointers that store data values mapped to each key value. According to an embodiment, the core body portion of a multimap stores tuples, each tuple storing at least a pair of values (K, V). One of the pair of values (e.g., K) is used to store the key value and the other value from the pair (e.g., V) is used to store the pointer. The data structures used for storing the data values mapped to a key may be a vector (or an array) data structure that stores all data values mapped to a key within a contiguous chunk of memory such that each data value mapped to a key is stored adjacent to one or more other data values mapped to that key.

FIG. 9A shows an example multimap 900 that is configured to store four distinct keys, according to an embodiment. When the system initializes the multimap, the system stores a null pointer for each key stored in the multimap 900a. Accordingly, each key 910a, 910b, 910c, 910d is mapped to a null pointer 915a, 915b, 915c, 915d.

FIG. 9B shows the example multimap 900 after a data value is stored in association with a key, according to an embodiment. The pointers 915a, 915b, 915c remain null pointers. However, the new data value is stored in association with key 910d such that the pointer 915d points at the vector. The new data value 920a is stored as the first element of the vector. The next element, i.e., the second element of the vector stores a size 925 that represents the size of the vector indicating the number of data values stored in the vector. For the example multimap 900b shown in FIG. 9B, the element storing the size 925 stores value 1 since there is only one data value associated with the key 910d stored in the vector 905. The pointer 915d associated with the key 910d points at the element of the vector storing the size 925.

Figure 9C:
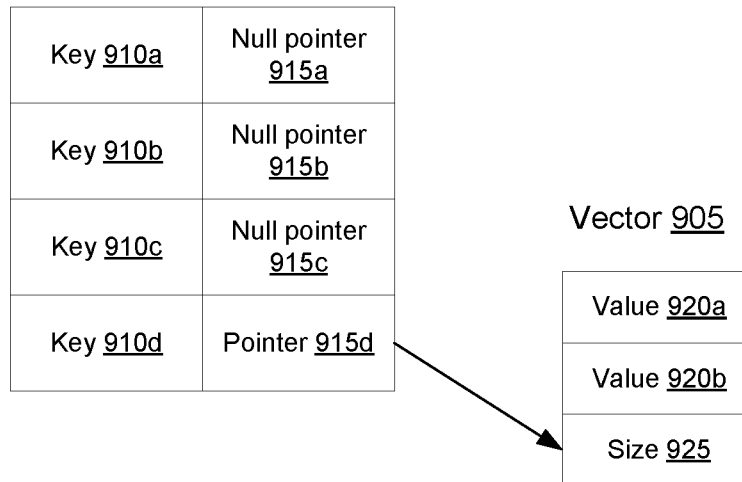
FIG. 9C shows the example multimap after another data value is added to the data structure in association with a key, according to an embodiment.

FIG. 9C shows the example multimap 900 after another data value is added to the data structure in association with a key, according to an embodiment. Since a new data value is associated with key 910d, the vector 905 as shown in FIG. 9C stores two data values 920a, 920b, and the size 925 that has value 2. The pointer 915d is moved to point to the size 925 element of the vector that is now the third element of the vector.

Figure 9D:
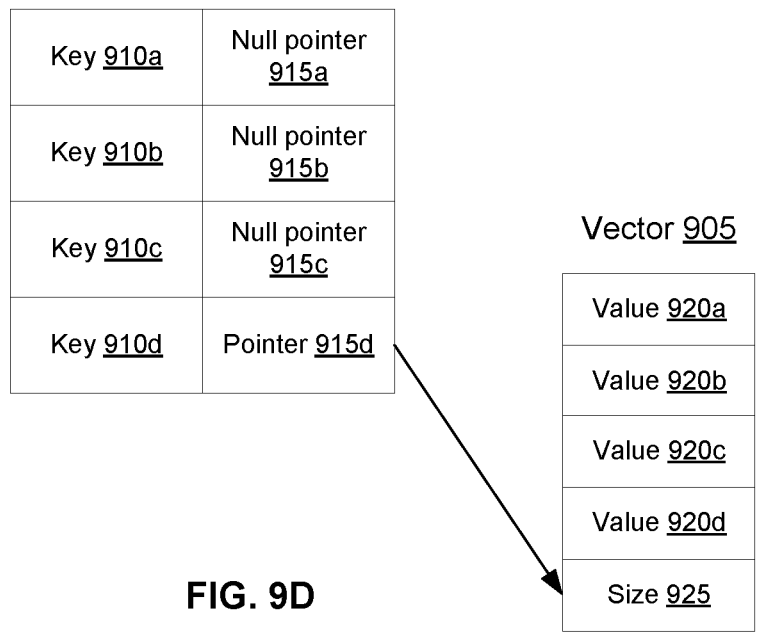
FIG. 9D shows the example multimap after four data values are stored in association with a key, according to an embodiment.

FIG. 9D shows the example multimap 900 after four data values are stored in association with a key, according to an embodiment. Accordingly, the four data elements 920a, 920b, 920c, 920d, are stored in the vector followed by the size 925. The fifth element of the vector 905 shown in FIG. 9D stores the size 925 representing number of data values, i.e., 4. The pointer 915d is updated to point at the size element.

Accordingly, each time a data value is added to a vector 905 storing the data values for a key, the data value is stored as the last element of the vector and replaces the element that previously stored the size 925. The size value is moved by one to the next free location of the vector.

According to an embodiment, the vector is allocated to have a particular capacity. If there are several data values that map to the same key, the capacity of the vector is exhausted when all elements of the vector V1 are used up to store the data values and the size value. If another data value is mapped to the same key, the system allocates a larger vector V2 and copies all the data values of vector V1 to the vector V2 and moves the pointer to point at the size element of the vector V2. According to an embodiment the system increases the size of the vector by a constant factor, for example, a factor 2 when the vector suns out of space. For example, the system doubles the size of the vector each time the vector runs out of space and copies over all the elements of the vector to the new vector. As a result, the system may perform less efficiently compared to a multimap based on a linked list data structure while building the multimap, particularly if a very large number of data values are mapped to the same key. However, the system performs more efficiently compared to a multimap based on linked list when data is repeatedly accessed.

Figure 10:
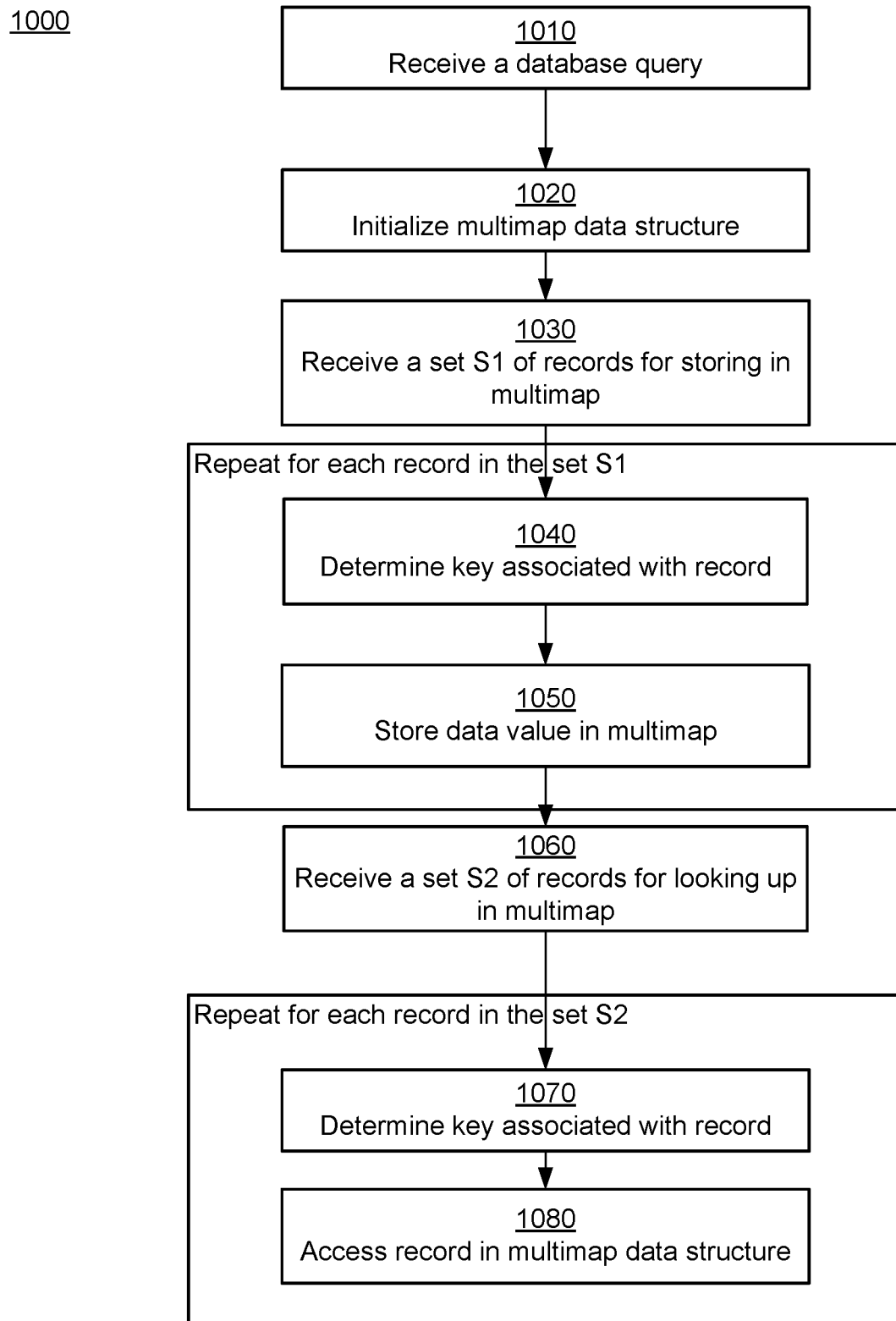
FIG. 10 shows a process for processing database queries using a multimap data structure according to an embodiment.

FIG. 10 shows a process for processing database queries using a multimap data structure according to an embodiment. The system, for example, the database system receives 1010 a database query, for example, a database query including a group by clause or a join query. The system initializes 1020 a multimap data structure. The system determines a capacity of the multimap data structure by determining the number of keys that need to be mapped using the multimap data structure. The system allocates space for storing the multimap data structure based on the number of keys. According to an embodiment, the system allocates space for storing pairs comprising a key and a pointer at a vector storing the data values. For example, if the memory size of a key is $M_K$ words and the memory size of a pointer is $M_P$ words, and the number of keys to be stored in the multimap data structure is N, the system allocates $N*(M_K+M_P)$ words.

The system receives a set S1 of records for storing data values in the multimap data structure. There may be one data value corresponding to each record that is stored in the multimap in association with a key corresponding to the record. The system repeats the steps 1040 and 1050 for each record of the set S1 that is processed for building the multimap. The system determines 1040 the key associated with a record. For example, the key may be a particular column of the record or a value based on a set of columns. The system identifies the location of the key in the multimap and stores 1050 the data value based on the record in the multimap. The details of the step 1050 for storing a data value in the multimap data structure is illustrated using FIG. 11 and described in detail in the description of FIG. 11.

The system receives 1060 a second set S2 of records for processing using the multimap. The system repeats the steps 1070 and 1080 for each record of the set S2 that is processed using the multimap. The system determines 1070 the key associated with a record of the set S2. The system accesses 1080 the record in the multimap for performing the processing. For example, the database query may perform a join of tables T1 and T2, and the set S1 of records may be based on records of table T1 and the set S2 of records may be based on records of table T2.

Figure 11:
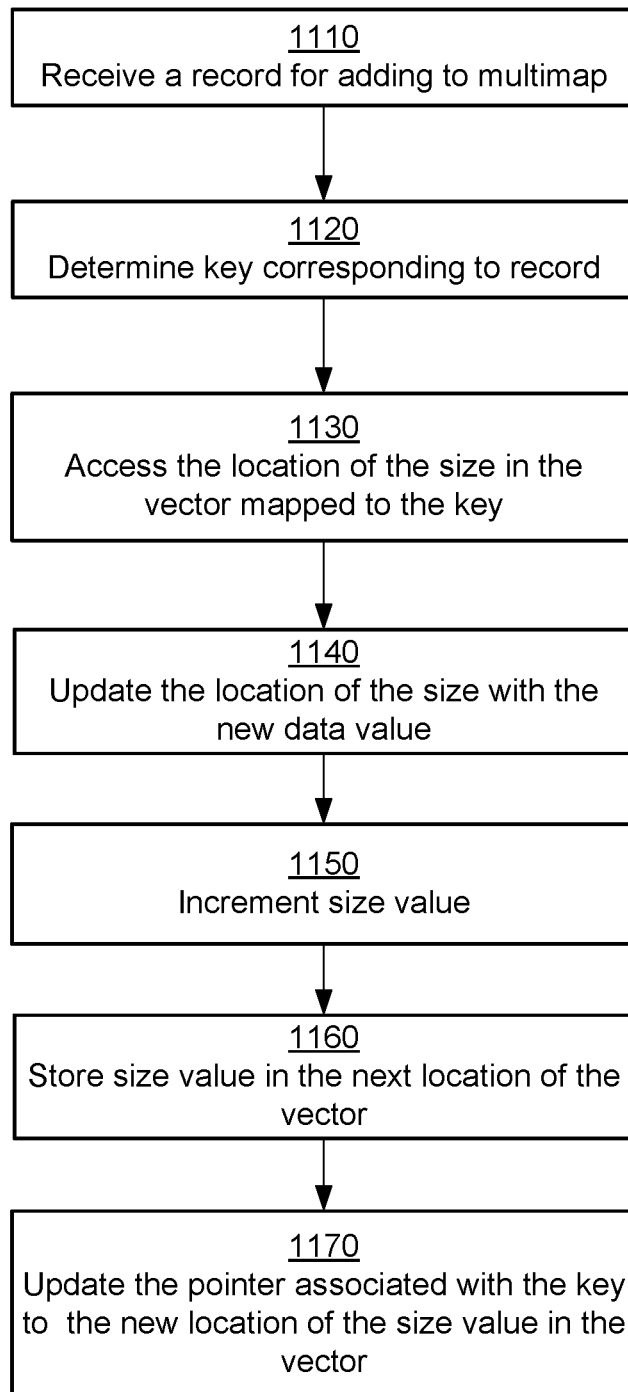
FIG. 11 shows a flowchart illustrating the process for adding a data value to the multimap data structure according to an embodiment.

FIG. 11 shows a flowchart illustrating the process for adding a data value to the multimap data structure according to an embodiment. The process shown in FIG. 11 represents details of the step 1050.

The system receives 1110 a record for adding a data value to the multimap. The system determines 1120 a key based on the record. The key may be determined using techniques described herein. The system accesses the pointer 915 associated with the key. The pointer may be null, in which case the system allocates a new vector, stores the data value as the first element of the vector and stores the size value of 1 in the second element of the vector since there is only one data value in the vector.

If the pointer is not null, the pointer points at a particular element of the vector storing data values for the key. In particular the pointer points at the element storing the size of the vector, i.e., the number of data values associated with the key that are currently stored in the multimap. The system uses the pointer to access 1130 the location of size of the vector mapped to the key. The system updates 1140 the location storing the size of the vector with the new data value based on the record. The system increments 1150 the size value since there is another data value added to the vector. The system stores 1160 the size value in the next location which represents the last element of the vector that stores valid values after adding the new data value. The system updates 1170 the pointer associated with the key to the new location of the size value stored in the vector.

If while storing the data value in the vector the system determines that the vector is full, i.e., the system allocates a new vector of larger size and copies the elements of the vector to the new vector. According to an embodiment the system maintains vectors that have sizes that are powers of two. Therefore, if the size element stores a value that is one less than a power of two (e.g., $2^K-1$, where K is a positive integer), the system determines that the vector is full and the system needs to increase the size of the vector. The system doubles the size of the vector when the system increases the size of the vector. Accordingly, the size value is increased and becomes a new power of two, e.g., $2^{(K+1)}$. The size value stored in the vector does not become equal to one less than a power of two (i.e., $2^{(K+1)}-1$) until the vector is full again based on the new size $2^{(K+1)}$.

In other embodiments, the size value stored as the last element of the vector may be a different function of a power of two, for example, the size value may store the total number of valid values stored in the vector including the size element itself. Accordingly, if there are N data values stored in the vector, the size value may store N+1. In this embodiment, the system determines that the vector is full of the value stored in the last element of the vector is a power of two, i.e., $2^K$, where K is a positive integer. In general, the system determines that the vector has reached capacity by comparing the value stored in the last element of the vector with a power of two. The system determines a predetermined relation between the size value and a power of two, for example, whether the size value is same as a power of two or one less than a power of two depending on how the size value was computed.

Figure 12:
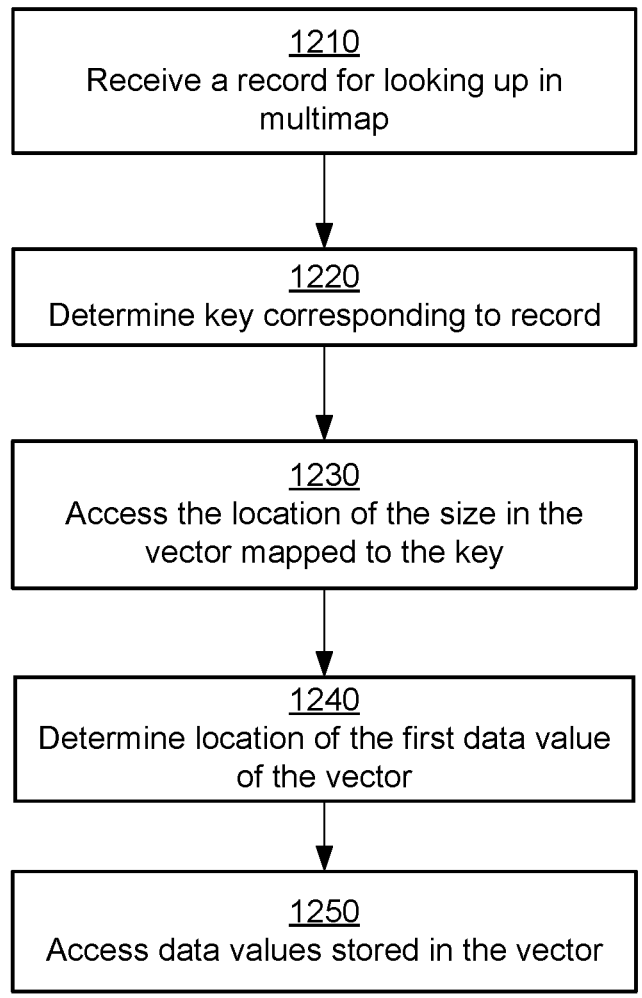
FIG. 12 shows a flowchart illustrating the process for accessing a data value from the multimap data structure according to an embodiment.

FIG. 12 shows a flowchart illustrating the process for accessing a data value from the multimap data structure according to an embodiment. The process shown in FIG. 12 represents details of the step 1080. The system receives 1210 a record for looking up in the multimap. The system determines 1220 a key corresponding to the received record. The system accesses 1230 the location of the size value (e.g., N) stored in the vector storing data values mapped to the key. The system uses the size value to determine 1240 the location of the first size value of the vector. The system accesses 1250 the data values stored in the vector, for example, by iterating through the data values stored in the vector from the first value to the $N^{th}$ value stored in the vector. The processing performed using the data values depends on the database query that is being processed.

Optimization of Multimap for Processing Database Queries

According to an embodiment, the system further optimizes storage of data in a multimap when the bit size of data values stored in the multimap is smaller than the bit size of a machine word. The multimap data structure as shown in FIGS. 9A-D stores pairs of key values and pointers to vectors or arrays storing the data values. Computers align pointers to arrays to the size of the machine word. A computers' machine word size can be 64 bits (or 8 bytes). Since 64 bits can store very large values, the binary representation of the memory address has the least significant bit set to 0. The system stores the data value directly in the multimap 900 instead of the pointer 915. The system uses the least significant bit to indicate whether the value stored in 915 is a pointer or the data value itself. Accordingly, for the first data value stored in the multimap data structure for a key, the system stores the data value directly in the multimap structure in place of the pointer without creating the vector structure for storing the data value. For subsequent data values, the system creates the vector structure and stores a pointer to the vector structure in the multimap. When the system stores the data value directly in the multimap structure instead of the pointer 915, the system shifts the data value by 1 bit before storing it in the multimap structure. The system sets the least significant bit to 1, indicating that the value stored in the multimap represents a data value and not a pointer.

According to an embodiment, the core body portion of a multimap stores tuples, each tuple storing at least a pair of values (V1, V2). One of the pair of values (e.g., V1) is used to store the key value and the other value from the pair (e.g., V2) is used to store either (1) the data value itself if a single data value is mapped to the key, or else (2) a pointer to a data structure storing a plurality of data values mapped to the key if multiple data values are mapped to the key. The least significant bit of value V2 is used to determine whether the value V2 represents the data value or a pointer. For example, of the least significant bit of value V2 is 1, the system determines that the value V2 represents a data value and if the least significant bit of value V2 is 0, the system determines that the value V2 represents a pointer.

Figures 13A, 13B:
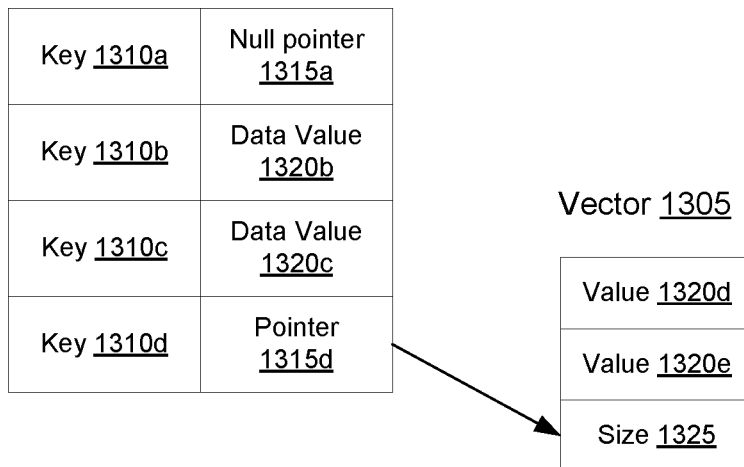
FIG. 13A illustrates a multimap efficiently storing single data values mapped to keys according to an embodiment.
FIG. 13B illustrates a multimap efficiently storing single data values as well as multiple data values mapped to keys according to an embodiment.

FIG. 13A illustrates a multimap efficiently storing single data values mapped to keys according to an embodiment. The example, multimap stores at least four tuples, each tuple representing a key and a value. The value associated with a key may be a pointer or a data value. The keys stored in the multimap 1300a are 1310a, 1310b, 1310c, 1310d. Initially all keys are associated with a null pointer. If data values are received for storing in the multimap data structures and if each key is associated with a single data value, the data value is stored along with the key within the core body of the multimap data structure as the value V2. For example, key 1310a is mapped to a null pointer 1315a, however keys 1310b, 1310c, 1310d are associated with data values 1320b, 1320c, 1320d respectively.

FIG. 13B illustrates a multimap efficiently storing single data values as well as multiple data values mapped to keys according to an embodiment. As shown in FIG. 13B, the multimap shown in FIG. 13A receives key 1310d is mapped to an additional data value 1320e. When the system receives a second data value mapped to the key (e.g., key 1310d), the system allocates a data structure configured to store multiple data values, for example, vector 1305, copies the data value 1320d to the vector and stores the new data value 1320e also in the vector 1305. According to an embodiment, the system stores the size 1325 as the last element in the vector 1305. The system changes the value V2 stored in the core body of the multimap in association with the key 1310d to a pointer 1315d that points at the data structure storing the multiple data values assigned to the key 1310d. As shown in FIG. 13B, the pointer 1315d points at the last element of the vector 1305 that stores the size of vector representing the number of data values stored in the vector 1305. The system may access data values stored in the vector using the techniques disclosed herein, for example, the process illustrated in FIG. 12 showing the details of step 1050.

Figure 14:
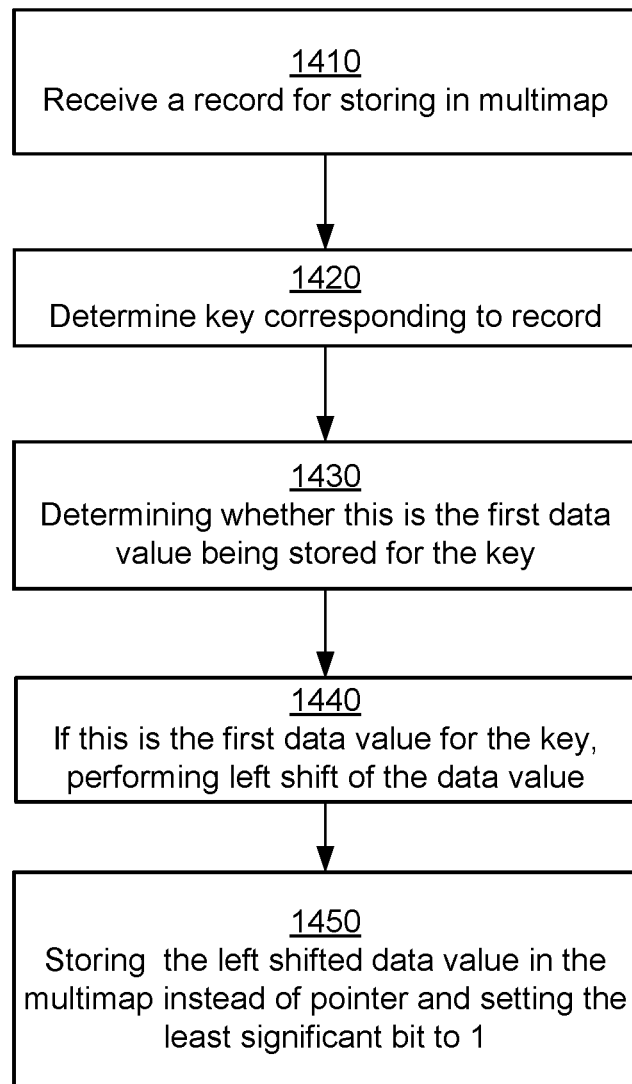
FIG. 14 shows a flowchart illustrating the process for storing data values in a multimap according to an embodiment.

FIG. 14 shows a flowchart illustrating the process 1400 for storing data values in a multimap according to an embodiment. The system receives 1410 a record for determining and storing a data value in the multimap data structure. The system determines the key corresponding to the record. The system determines whether this is the first data value being stored for the key. For example, if the system determines that the value V2 associated with the key is a null pointer, the system determines that there is no currently stored value for the key, and this is the first data value being stored in association with the key. If the system determines that the received data value is the first data value being stored for the key, the system performs 1440 left shift operation on the data value to shift the bits of the data value by one bit. The system stores 1450 the left shifted data value as the value V2 in the multimap data structure instead of the null pointer. The system also sets the least significant bit of the value stored as value V2 in association with the key to bit value 1.

Figure 15:
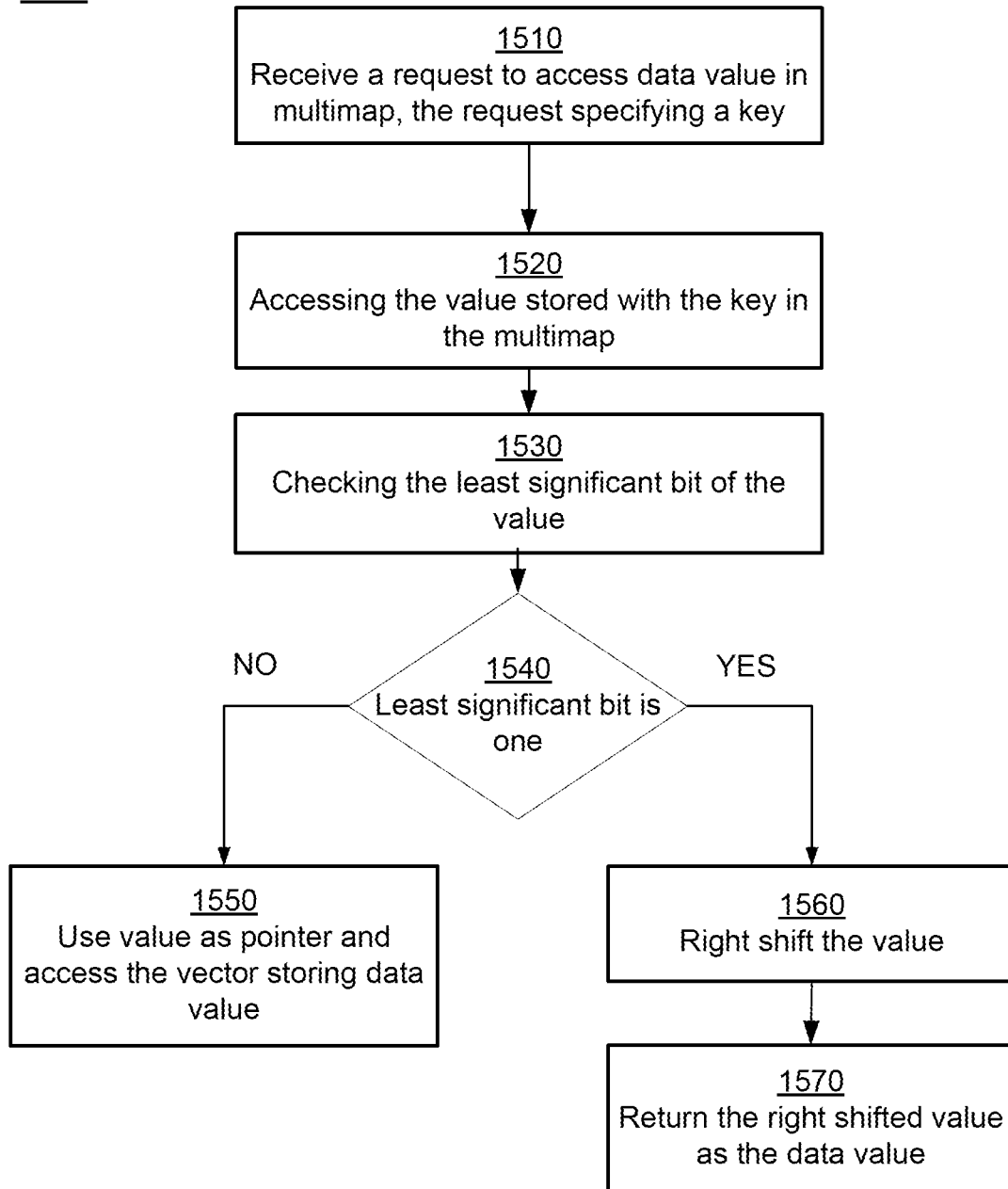
FIG. 15 shows a flowchart illustrating the process for accessing data values stored in a multimap according to an embodiment.

FIG. 15 shows a flowchart illustrating the process for accessing data values stored in a multimap according to an embodiment. The system receives 1510 a request to access data values from the multimap. The request may specify a key value K1 for performing the access. The request may specify a record and the key value used for performing the access may be derived from the record. The system accesses 1520 the value V2 stored in the tuple corresponding to the key value K1 that is stored in the core body of the multimap data structure. The system checks 1530 the least significant bit of the value accessed to determine the type of value stored as value V2 in association with the key K1. If the system determines 1540 that the least significant bit value is not 1 (i.e., the least significant bit value is zero), the system uses 1550 the value V2 as a pointer for accessing a vector data structure storing data values mapped to the key K1. If the system determines 1540 that the least significant bit value is 1, the system determines that the value V2 stored in the multimap data structure in association with key K1 is a data value. Accordingly, the system performs 1560 a right shift operation by shifting the value accessed by 1 bit. The system returns the right shifted value as the data value mapped to the key K1. Accordingly, the system optimizes access and storage of data values mapped to keys if a single data value is mapped to the key.

There are several applications that process a single value per key that is smaller than a computer word. For example, such applications include applications that perform hash join operations used commonly in databases and data frame libraries. The technique disclosed for efficiently storing data in a multimap improves memory utilization, reduces the number of memory load operations performed and improves the number of unique cache lines accessed when inserting or retrieving data.

Architecture of Computer

Figure 16:
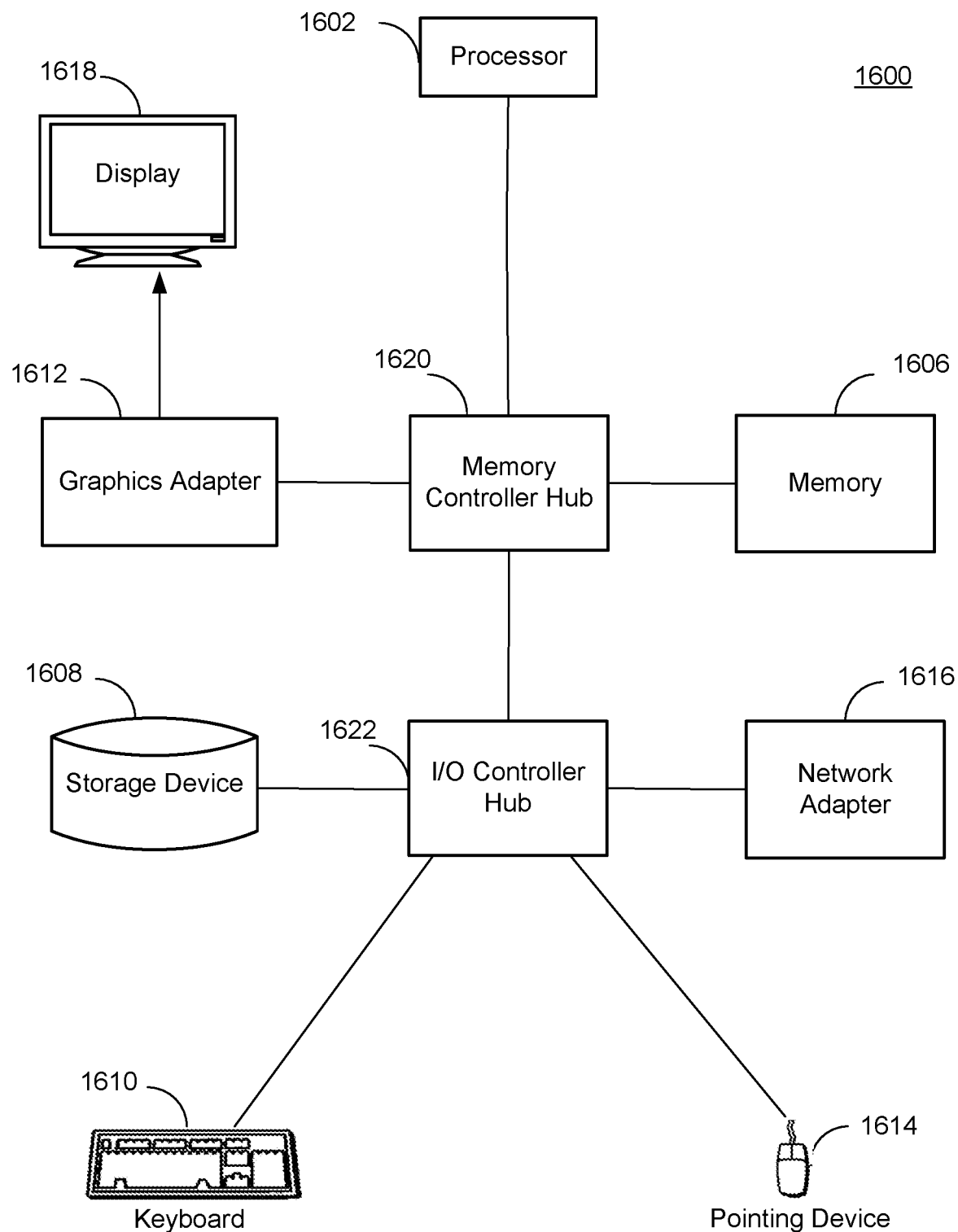
FIG. 16 is a high-level block diagram illustrating an example of a computer for use as one or more of the entities illustrated in FIG. 1, according to one embodiment.

FIG. 16 is a high-level block diagram illustrating an example of a computer 1600 for use as one or more of the entities illustrated in FIG. 1, according to one embodiment. Illustrated are at least one processor 1602 coupled to a memory controller hub 1620, which is also coupled to an input/output (I/O) controller hub 1622. A memory 1606 and a graphics adapter 1612 are coupled to the memory controller hub 1622, and a display device 1618 is coupled to the graphics adapter 1612. A storage device 1608, keyboard 1610, pointing device 1614, and network adapter 1616 are coupled to the I/O controller hub. The storage device may represent a network-attached disk, local and remote RAID, or a SAN (storage area network). A storage device 1608, keyboard 1610, pointing device 1614, and network adapter 1616 are coupled to the I/O controller hub 1622. Other embodiments of the computer 1600 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 1608 includes one or more non-transitory computer-readable storage media such as one or more hard drives, compact disk read-only memory (CD-ROM), DVD, or one or more solid-state memory devices. The memory holds instructions and data used by the processor 1602. The pointing device 1614 is used in combination with the keyboard to input data into the computer 1600. The graphics adapter 1612 displays images and other information on the display device 1618. In some embodiments, the display device includes a touch screen capability for receiving user input and selections. One or more network adapters 1616 couple the computer 1600 to a network. Some embodiments of the computer have different and/or other components than those shown in FIG. 16. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 1600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method for executing database queries, the computer-implemented method comprising:

receiving, by a database system, a database query for processing data stored in one or more input tables;

generating a hash table configured to store a plurality of keys, each of the plurality of keys associated with one or more data values; generating the hash table comprising:

applying a hash function to the plurality of keys to map each of the plurality of keys to a corresponding position within the hash table; and storing the plurality of keys and associated data values in the hash table at their corresponding positions, such that the plurality of keys and associated data values are stored in a particular order in the hash table;

processing the database query, comprising:

receiving a set of records, each record associated with a key;

reordering the set of records to obtain a reordered set of records that is at least partially sorted to match the particular order of the plurality of keys in the hash table, wherein the reordering comprises:

performing a first pass through the set of records to determine a count of records assigned to each of a plurality of buckets, wherein the buckets are defined based on the hash function;

computing, based on the counts, an offset for each bucket representing a position for storing records assigned to the respective bucket; and performing a second pass through the set of records to place the records in positions based on their respective bucket offsets, thereby obtaining the reordered set of records;

accessing the hash table in order of the reordered set of records, comprising, for each record of the reordered set of records, accessing a data value stored in the hash table that is mapped to a key corresponding to the record; and determining a set of results based on data values accessed from the hash table; and providing the set of results as a result of processing the database query.

2. The computer-implemented method of claim 1, wherein the database query specifies a group by operation that determines an aggregate value for each group based on keys of the hash table, wherein the data value stored in the hash table that is mapped to a key corresponding to the record is a partial aggregate value determined based on a subset of the set of records processed.

3. The computer-implemented method of claim 1, wherein the database query specifies a join operation between a first table and a second table, wherein the hash table stores data values based on the first table, and the set of records is from the second table.

4. The computer-implemented method of claim 1, wherein applying the hash function to the plurality of keys comprises:

determining a plurality of buckets, wherein a number of buckets is determined based on a number of keys that can be stored in the hash table, wherein the buckets are ordered;

associating each record of the set of record with a bucket from the plurality of buckets; and processing the keys in an order of the buckets.

5. The computer-implemented method of claim 4, wherein a set of keys assigned to a bucket are stored in proximity with each other in the hash table compared to keys assigned to other buckets.

6. The computer-implemented method of claim 4, wherein the number of buckets is a power of two.

7. The computer-implemented method of claim 4, wherein the database query is processed using a plurality of processors, wherein a first subset of the set of records associated with a first bucket is processed using a first processor and a second subset of the set of records associated with a second bucket is processed using a second processor.

8. A computer readable storage medium storing instructions for a method for executing database queries, the instructions when executed by a computer processor cause the computer processor to perform steps comprising:

receiving, by a database system, a database query for processing data stored in one or more input tables;

generating a hash table configured to store a plurality of keys, each of the plurality of keys associated with one or more data values, generating the hash table comprising:

applying a hash function to the plurality of keys to map each of the plurality of keys to a corresponding position within the hash table; and storing the plurality of keys and associated data values in the hash table at their corresponding positions, such that the plurality of keys and associated data values are stored in a particular order in the hash table;

processing the database query, comprising:

receiving a set of records, each record associated with a key;

reordering the set of records to obtain a reordered set of records that is at least partially sorted to match the order of keys in the hash table, wherein the reordering comprises:

performing a first pass through the set of records to determine a count of records assigned to each of a plurality of buckets, wherein the buckets are defined based on the hash function;

computing, based on the counts, an offset for each bucket representing a position for storing records assigned to the respective bucket; and performing a second pass through the set of records to place the records in positions based on their respective bucket offsets, thereby obtaining the reordered set of records;

accessing the hash table in order of the reordered set of records, comprising, for each record of the reordered set of records, accessing a data value stored in the hash table that is mapped to a key corresponding to the record; and determining a set of results based on data values accessed from the hash table; and providing the set of results as a result of processing the database query.

9. The computer readable storage medium of claim 8, wherein the database query specifies a group by operation that determines an aggregate value for each group based on keys of the hash table, wherein the data value stored in the hash table that is mapped to a key corresponding to the record is a partial aggregate value determined based on a subset of the set of records processed.

10. The computer readable storage medium of claim 8, wherein the database query specifies a join operation between a first table and a second table, wherein the hash table stores data values based on the first table, and the set of records is from the second table.

11. The computer readable storage medium of claim 8, wherein applying a hash function to the plurality of keys comprises:
   determining a plurality of buckets, wherein a number of buckets is determined based on a number of keys that can be stored in the hash table, wherein the buckets are ordered;
   associating each record of the set of record with a bucket from the plurality of buckets; and
   processing the keys in an order of the buckets.

12. The computer readable storage medium of claim 11, wherein a set of keys assigned to a bucket are stored in proximity with each other in the hash table compared to keys assigned to other buckets.

13. The computer readable storage medium of claim 11, wherein the number of buckets is a power of two.

14. The computer readable storage medium of claim 11, wherein the database query is processed using a plurality of processors, wherein a first subset of the set of records associated with a first bucket is processed using a first processor and a second subset of the set of records associated with a second bucket is processed using a second processor.

15. A computer system comprising:
   a computer processor; and
   a computer-implemented method for executing database queries, the computer-implemented method comprising:
      receiving, by a database system, a database query for processing data stored in one or more input tables;
      generating a hash table configured to store a plurality of keys, each of the plurality of keys associated with one or more data values, generating the hash table comprising:
         applying a hash function to the plurality of keys to map each of the plurality of keys to a corresponding position within the hash table; and
         storing the plurality of keys and associated data values in the hash table at their corresponding positions, such that the plurality of keys and associated data values are stored in a particular order in the hash table;
      processing the database query, comprising:
         receiving a set of records, each record associated with a key;
         reordering the set of records to obtain a reordered set of records that is at least partially sorted to match the order of keys in the hash table, wherein the reordering comprises:
            performing a first pass through the set of records to determine a count of records assigned to each of a plurality of buckets, wherein the buckets are defined based on the hash function;
            computing, based on the counts, an offset for each bucket representing a position for storing records assigned to the respective bucket; and
            performing a second pass through the set of records to place the records in positions based on their respective bucket offsets, thereby obtaining the reordered set of records;
         accessing the hash table in order of the reordered set of records, comprising, for each record of the reordered set of records, accessing a data value stored in the hash table that is mapped to a key corresponding to the record; and
         determining a set of results based on data values accessed from the hash table; and
      providing the set of results as a result of processing the database query.

16. The computer system of claim 15, wherein the database query specifies a group by operation that determines an aggregate value for each group based on keys of the hash table, wherein the data value stored in the hash table that is mapped to a key corresponding to the record is a partial aggregate value determined based on a subset of the set of records processed.

17. The computer system of claim 15, wherein the database query specifies a join operation between a first table and a second table, wherein the hash table stores data values based on the first table, and the set of records is from the second table.

18. The computer system of claim 15, wherein applying a hash function to the plurality of keys comprises:
   determining a plurality of buckets, wherein a number of buckets is determined based on a number of keys that can be stored in the hash table, wherein the buckets are ordered;
   associating each record of the set of record with a bucket from the plurality of buckets; and
   processing the keys in an order of the buckets.

19. The computer system of claim 18, wherein a set of keys assigned to a bucket are stored in proximity with each other in the hash table compared to keys assigned to other buckets.

20. The computer system of claim 18, wherein the database query is processed using a plurality of processors, wherein a first subset of the set of records associated with a first bucket is processed using a first processor and a second subset of the set of records associated with a second bucket is processed using a second processor.

* * * * *